UNITED STATES PATENT OFFICE.

AUGUST PRISTER, OF GRADISCA, AUSTRIA-HUNGARY.

PROCESS OF PRECIPITATING GOLD FROM CYANID SOLUTIONS.

SPECIFICATION forming part of Letters Patent No. 722,455, dated March 10, 1903.

Application filed November 5, 1901. Serial No. 81,257. (No specimens.)

*To all whom it may concern:*

Be it known that I, AUGUST PRISTER, professor, of Gradisca, Austria-Hungary, have invented certain new and useful improvements in processes for the precipitation of gold and other precious metals from weak cyanid solutions, such as potassium cyanid, sodium cyanid, and bromin cyanid, of which the following is a specification.

In the different methods hitherto known for the precipitation of gold or other precious metals contained in a solution of a cyanid more especially the MacArthur-Forrest's process has found practical application. The essential feature upon which the same is based is that the gold is precipitated by zinc from the solution wherein it is contained.

According to another method in use the gold is precipitated from the cyanid solution by a cuprous salt in the following manner: The cyanid solution containing the gold is first neutralized with a mineral acid. To this solution a cuprous salt (cuprous chlorid) is added, a double salt of gold cuprous cyanid is formed and precipitated, the clear solution is decanted and filtered, the precipitate collected, dried, roasted, and treated with sulfuric acid in order to recover the copper for a subsequent operation. The residue containing the gold bullion is dried and smelted, as usual.

In the method here in question the mineral-bearing gold or other precious metals are, as usual, treated with a weak solution of cyanid of potassium, cyanid of sodium, or cyanid of bromin. The gold-containing solution is then acidulated by sulfuric acid, bisulfate of sodium, (NaHSO$_4$,) or sulfurous anhydrid. To this acid solution a weak solution of a mercurous salt containing, say, one to five per cent. of metallic mercury is added. The quantity of salt of mercury necessary for carrying out this method is to be calculated so that about seven to twenty parts of mercury to one part of gold will be contained in the solution.

Among the various salts of mercury the mercurous nitrate (Hg$_2$(No$_3$)$_2$) dissolved in water or in diluted nitric acid (1:1,000) is most suitable. Also with an aqueous solution of the double salt of ammonium nitrate and mercurous nitrate highly-satisfactory results are obtained.

Should the auriferous mineral submitted to this process exceptionally contain no copper salts, a quarter of an hour after the addition of the mercurous salt to the solution some copper salt is to be added thereto. The copper salts are added for completing the precipitation of the gold, as fifty per cent. to eighty per cent. of the gold is precipitated by the mercurous salts. The quantity of copper salt is to be calculated so that about one to seven parts of copper to one part of gold will be contained in the solution; but as a rule the minerals to be treated contain the necessary amount of copper salt, so as to render its subsequent addition superflous. For the purpose of accelerating the process of precipitation a small quantity—say ten per mille—of a cyanid solution coming from the ordinary zinc-precipitation boxes may be added to the acid gold-bearing solution four to six hours after the addition of the mercurous salt. Should this cyanid solution not be available, an alkaline or neutral aqueous solution of a zinc salt and of, say, about five per cent. of an aqueous solution of potassium ferrocyanid or of potassium ferricyanid may be added.

The above-described method gives a mercurous precipitate containing gold or other precious metals from which the solution containing no gold will be decanted, the collected precipitate being subsequently dried and distilled. The mercury distils over, whereupon the gold or the precious metals remaining in the retorts are melted as usual.

As the chemical formula and exact composition of the double aura-mercuro salt could not be determined, it is not given. The salt has been found to contain fifty per cent. of gold.

What I claim, and desire to secure by Letters Patent of the United States, is—

1. The process herein described for the precipitation of gold and other precious metals from cyanid solutions, such as potassium cyanid, sodium cyanid and bromin cyanid, which consists in acidifying the solution, then adding a mercurous salt in combination with small quantities of a copper salt, substantially as set forth.

2. The process herein described for the precipitation of gold or other precious metals from cyanid solutions, such as potassium cyanid, sodium cyanid and bromin cyanid, which consists in acidifying the solution, adding a solution containing salts of mercury and copper, and then adding a solution containing zinc salts and a small percentage of a potassium ferrocyanid, substantially as set forth.

3. The process herein described for the precipitation of gold and other precious metals from cyanid solutions, such as potassium cyanid, sodium cyanid and bromin cyanid, which consists in acidifying the solution, adding a solution containing salts of mercury and copper, and then adding a small quantity of the cyanid solution discharged from the ordinary zinc-precipitation boxes, substantially as set forth.

In witness whereof I have hereunto set my hand in presence of two witnesses.

AUGUST PRISTER.

Witnesses:
HENRY HASPER,
WOLDEMAR HAUPT.